United States Patent
Teahan

[11] 3,851,409
[45] Dec. 3, 1974

[54] MATHEMATICAL EDUCATIONAL DEVICE
[76] Inventor: Teresa C. Teahan, 304 N.W. 26th St., Gaineville, Fla. 32607
[22] Filed: Mar. 20, 1974
[21] Appl. No.: 452,686

Related U.S. Application Data
[63] Substitute for Ser. No. 271,142, July 12, 1972, abandoned.

[52] U.S. Cl. ..................................... 35/31 F, 35/70
[51] Int. Cl. ............................................ G09b 19/02
[58] Field of Search....... 35/31 R, 31 B, 31 D, 31 F, 35/31 G, 69, 70, 72, 73

[56] References Cited
UNITED STATES PATENTS

| | | | |
|---|---|---|---|
| 2,635,355 | 4/1953 | Thompson et al. | 35/31 G |
| 2,663,096 | 12/1953 | McCurdy | 35/70 |
| 3,002,295 | 10/1961 | Armstrong | 35/31 G |
| 3,229,388 | 1/1966 | Smith | 35/70 |

FOREIGN PATENTS OR APPLICATIONS

| | | | |
|---|---|---|---|
| 321,251 | 5/1902 | France | 35/31 D |

*Primary Examiner*—Wm. H. Grieb
*Attorney, Agent, or Firm*—Salvatore C. Mitri

[57] ABSTRACT

A mathematical educational device or game is provided comprising at least two playing boards each of which has a triangular cut-out the base of which is open and co-extensive with one side edge of the playing board while the apex opposite the base lies within the body of the board. Within the triangular cut-out are nine removable slats or pegs numbered sequentially from "1"–"9" and these slats or pegs are individually shaped so that, when collectively assembled, they fit within the triangular cut-out diverging from the apex of the cut-out to its base. The middle peg of the group of nine pegs is numbered "5" and is square cut on both ends while the pegs to either side of it are biased cut at their upper ends so that each peg on one side of mid peg "5" has a counterpart or mirror-image peg on the other side of the mid peg.

To utilize the mathematical device requires the use of at least two boards with the pegs in each board assigned a value, the lowest value being unity and the value assigned to pegs in successive boards being no greater than one multiple of ten.

The device not only provides a method for expressing and teaching mathematics, but readily lends itself to teaching various mathematical concepts such as the use of "base ten," grouping of numbers, "borrowing" and "carrying" for solving problems of subtraction and addition, and the like.

5 Claims, 9 Drawing Figures

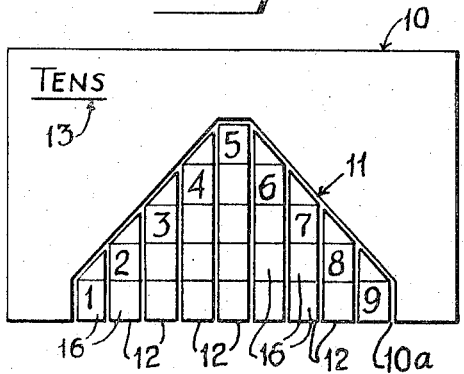
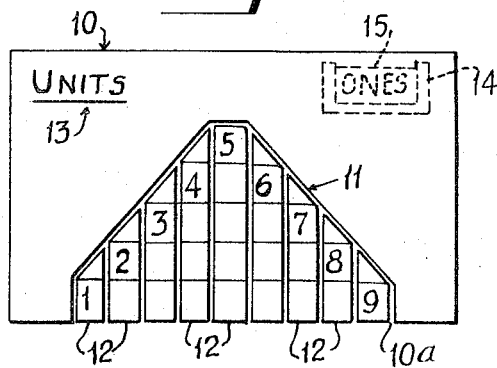
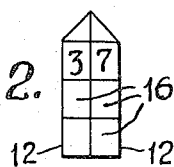
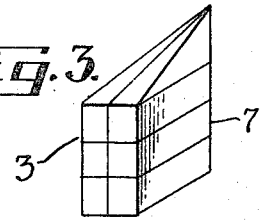
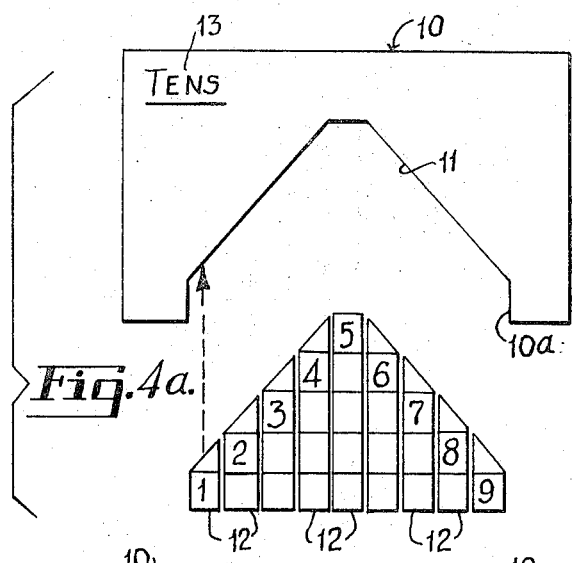
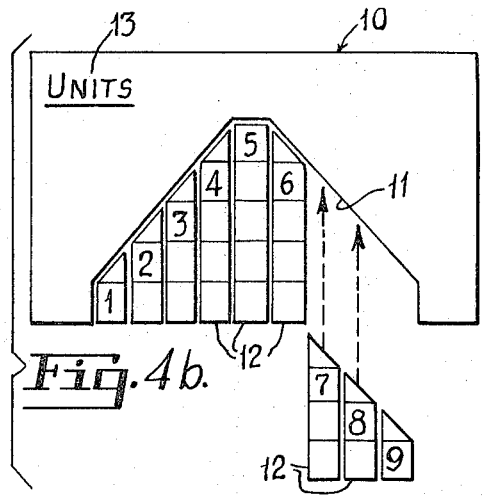
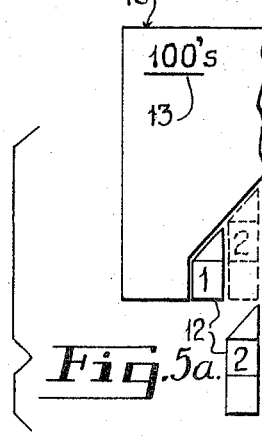
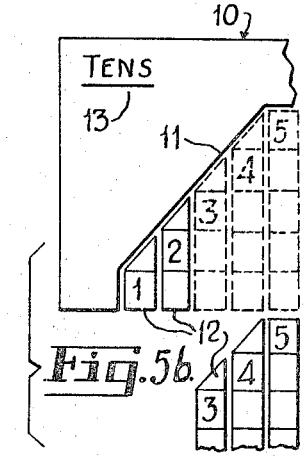
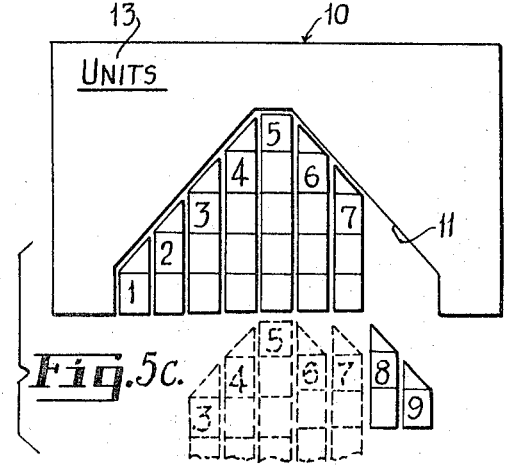

MATHEMATICAL EDUCATIONAL DEVICE

This invention relates to a mathematial device useful as an aid in teaching mathematical values, geometric shapes and forms, concepts of the "base ten," correlation of groups of values, concepts of "borrowing" and "carrying," and the like.

BACKGROUND OF THE INVENTION

In the field of educational games, toys, devices and other aids directed toward teaching and/or simplifying mathematics, the prior art is replete with a host of such aids and devices. These prior art devices or games generally comprise a plurality of blocks or cubes which can variously be assigned either a numerical value noted by design or shape, such as a diamond, and which can be manipulated either singly or collectively in solving simple mathematical problems. In some instances, the blocks are intended to be stacked to arrive at a value by either adding or removing one or more blocks and where this is provided, a relationship between each block or between groups of blocks is established. Some of these devices have a board or frame within which the blocks are manipulated while others have a central bore through the blocks for stacking them on vertical rods.

While these prior art aids and devices are recognized as having made a significant contribution to this area of art, none of these devices exhibit the flexibility of use of the device of this invention nor do these prior art devices lend themselves as aids in teaching several mathematical concepts as does the device of this invention.

THE INVENTION

The desirability of incorporating several mathematical concepts in a single teaching aid is now realized in the mathematical educational device or game of this invention. In general, the device of the invention comprises at least two playing boards each of which has a triangular cut-out within it, the base of the triangle being open and co-extensive with one side edge of the board with the apex of the triangle lying within the body of the board. Within each triangular cut-out are nine removable slats or pegs which are numbered sequentially from "1"–"9". These slats or pegs are individually shaped so that when they are collectively assembled, they fit within the triangular cut-out diverging from its apex to its base. The middle peg of the group of nine pegs is numbered "5" and is square cut on both ends. The pegs to either side of this mid peg are biased cut at their upper ends so that each peg on one side of mid peg "5" has a counterpart or mirror-image peg on the other side of mid peg "5." The trinagular cut-out is an isoscles triangle and when assembled in their numerical order, the pegs resemble a peaked roofed house In preferred embodiments, mid peg "5" is provided with five identical boxes or squares and each pair of counterpart or mirror-image pegs contains the same number of squares in descending order from the mid peg. Thus, pegs numbered "1" and "9" at each extremity from the mid peg each contain one box or square.

At least two boards are required to use the mathematical device with the pegs in each board assigned a value, the lowest value being unity and the value assigned to pegs in successive boards being no greater than one multiple of ten.

The device of the invention not only provides a method for teaching addition and subtraction, but has an inherent flexibility so that it can be readily utilized as a teaching aid for various mathematical concepts such as "base ten," grouping of numbers and values, "borrowing" and "carrying" as used in solving problems of subtraction and addition, and the like, as well as recognition of geometric shapes.

The device of the invention and the manner in which it can be used as a teaching aid will become more apparent from the ensuing description when considered together with the accompanying drawing wherein the several figures illustrate the device and various forms of its use and wherein:

FIGS. 1a and 1b are plan views of two playing boards of the device;

FIG. 2 is a plan view illustrating one way in which counterpart pegs of the device can be paired;

FIG. 3 is a perspective view illustrating another way in which counterpart pegs of the device can be paired;

FIGS. 4a and 4b are plan views illustrating the manner in which the playing board and pegs of the device can be utilized in solving mathematical problems requiring the use of at least two of the playing boards; and, FIGS. 5a – 5c are plan views, partly fragmented, illustrating the use of the device to solve mathematical problems requiring the use of at least three playing boards.

Since the mathematical educational device requires the use of at least two boards, FIGS. 1a and 1b should be considered together and they are shown as would be viewed by a user. As seen in FIGS. 1a and 1b the device comprises rectangularly shaped boards 10 each having a triangular cut-out 11 generally resembling the peaked roof of a house. The apex of the triangular cut-out 11 lies within the body of the board 10 while its base is co-extensive with the open edge of board 10 as seen at 10a. Shaped to fit within each cut-out 11 are a group of removable slats or pegs 12 which are numbered from "1" to "9", inclusive. Each of the pegs or slats 12, except for those bearing number "5, " are bias cut at their upper ends and square edged at their opposite ends so that when pegs 12 are assembled side-by-side in ascending numerical order, they collectively fit within and form the same shape as triangular cut-out 11 as clearly shown in FIGS. 1a and 1b.

The pegs in each board are assigned a value which can be indicated on the boards as at 13. As shown in FIG. 1b, the value of each peg 12 would be unity or "one" while the value of each peg 12 in board 10 of FIG. 1a is "ten". These assigned values can be either permanentl imprinted on each board or means can be provided on the boards for removing and changing the assigned value. One such means is shown in dotted lines on board 10 of FIG. 1b in the form of a slotted frame 14 into which a card 15 bearing the assigned value can be removably placed.

The pegs 12 on one side of mid peg numbered "5" are each mirror images of the pegs on the other side of the mid peg so that each peg, except the mid peg, has a geometric counterpart. Hence, regardless of the value assigned to the pegs of a particular board, each peg within the board, except the mid peg, can be geometrically paired with another peg and the numerical value of the paired pegs will always equal "ten." For example, pegs numbered "1" and "9," "2" and "8," "3" and "7," and "4" and "6" are mirror-image pegs and when these sets of pegs are paired, their numerical values total "ten," as illustrated in FIG. 2. Alternatively, for example, peg numbered "7" can be superimposed on peg numbered "3" as shown in FIG. 3 since these pegs are mirror images of each other as are the other pairs of numbered pegs as described above.

In a further embodiment, each of the pegs 12 can have identical boxes or squares 16 (FIG. 1a), the number of boxes or squares 16 on each of the pegs 12 on one side of the mid peg being the same as contained on its mirror image peg on the other side of the mid peg. As seen in FIG. 1a, mirror image pegs "1" and "9" each have one square, pegs "2" and "8" each have two squares, pegs "3" and "7" each have three squares, and pegs "4" and "6" each have four squares while peg "5" has five squares.

Bearing in mind the numerical and geometric relationship of the pegs and the values assigned to them as described immediately above, and with reference to the remaining figures of the drawing, the manner in which the device of the invention can be used will be readily understood by a few illustrative examples.

Referring first to the board shown in FIG. 4b it will first be seen that the numerical value assigned to the pegs in this board is "Units" and that pegs numbered "1" – 6" are shown occupying cut-out 11 in side-by-side relationship. If one had to perform the addition of "6+2" with this arrangement, one would merely move the next two pegs numbered "7" and "8" into place in the cut-out 11, as shown by the broken line arrows, and read the numerical value of the last peg to obtain the anwer: eight. Again referring to FIG. 4b, if one were to add "6+9, " it is obvious from the arrangement of the pegs that nine more pegs can not be placed in cut-out 11. In this instance, one would then utilize the board having the next higher assigned valuation; that is, the "Tens" board of FIG. 4a, bearing in mind that the numerical value of each peg in the board of FIG. 4a is "ten". Moving to the board of FIG. 4a, therefore, one would insert the peg numbered "1" into its place in the cut-out 11 as shown by the broken line arrow in FIG. 4a. This addition of a peg in the next higher valuation board (FIG. 4a) requires compensation of the preceding lower valuation board (FIG. 4b) by removal of one or more pegs from it. To determine how many pegs are to be removed from the lower valuation board (FIG. 4b), one first finds that peg bearing the same numeral as the value to be added. In this problem, it is peg numbered "9." Now the number of pegs to be removed can be determined by either (a) counting the number of squares in this peg and/or (b) pairing this peg with its counterpart (as in FIGS. 2 and 3) and reading the numeral on the counterpart peg. In this example, only one peg is to be removed from the board in FIG. 4b since peg numbered "9" contains one square and, when paired with its mirror image or counterpart peg numbered "1" by either of the methods shown in FIGS. 2 and 3, it will be seen that this counterpart peg has a numerical value of "one." As a result, the board of FIG. 4a would contain only the peg numbered "1" with a value of "ten" and the board in FIG. 4b would contain five pegs numbered "1" to "5" each having a value of "one" to provide the answer: fifteen.

Following this same procedure, a more complex problem is illustrated and its resolution will become apparent by considering the boards shown in FIGS. 5a, 5b and 5c, together with the ensuing description.

As presently arranged, the boards shown in FIGS. 5a, 5b and 5c reveal a value of "127" as computed from the value assigned to each of the pegs in the board of FIG. 5a which is one hundred, the value assigned to each of the pegs in the board of FIG. 5b is ten, and the value assigned to each of the pegs in the board of FIG. 5c is one. Thus, the pegs in place in the cut-outs of these boards numerically total "127." With this arrangement, consider the addition problem:

127 +125

In solving mathematical problems with the device of the invention, it is preferable that the problem be stated in column form rather than linearly for greater ease of manipulation of the pegs as will become more apparent in this illustrative problem. Referring first to the "ones" column in this problem and the board in FIG. 5c, it will be seen that five more pegs cannot be added to or inserted in the cut-out of the board in FIG. 5c. Hence, the next numerically higher peg, peg numbered "3," is added to the cut-out of the board in FIG. 5b as shown in dotted lines. Since the value to be added in the "ones" column is "five" and since the peg numbered "5" has no counterpart or mirror image peg, the number of squares or boxes in the "5" peg are counted to determine the number of pegs to be removed from the board in FIG. 5c. In this case, the five numerically highest pegs are to be removed as shown in dotted lines in FIG. 5c leaving only pegs numbered "1" and "2" in the cut-out of the board of FIG. 5c. Referring next to the "tens" column of our problem, it can be seen that the value to be added is "twenty." Since the cut-out in the "Tens" board in FIG. 5b can accomodate two more pegs, pegs numbered "4" and "5" are inserted as shown by dot-dash lines in FIG. 5b so that the "Tens" board now contains pegs numbered "1" – "5". Next, the "hundreds" column of this problem indicates that the value to be added is "one hundred" and, since the cut-out in the "100s" board of FIG. 5a can accomodate an additional peg, the next numerically higher peg, peg numbered "2," is inserted as shown in dot-dash lines so that the "100s" board of FIG. 5a now contains pegs numbered "1" and "2." Remembering the value assigned to the pegs in each board, the answer to the problem can now be read directly from the boards in FIGS. 5a–5c as "252."

Utilizing the same principles and manipulative procedures in reverse, problem of subtraction can also be solved bearing in mind that the manual steps of inserting pegs in the cut-outs proceeds from the left side to the right side of the boards while removal of pegs from the cut-outs is in the opposite direction from the right side to the left side of the boards.

The device of the invention can comprise any number of boards in excess of the minimum of two boards, but the value between each successive board must always be a multiple of ten. From the foregoing, it will be readily appreciated that the device lends itself as an aid to teaching arithmetic and combines several desirable mathematical features and concepts such as recognition of numbers, counting, symmetrical geometric arrangements, use of the base ten, "carrying" in adding, "borrowing" in subtraction, grouping of units, and the like.

What is claimed:

1. A mathematical educational device comprising at least two playing boards, each of said boards having an isoscles triangular cut-out therein with the apex of said triangular cut-out lying within the body of said board and the base thereof open and co-extensive with one edge of said board; nine removable pegs for each of said boards, the mid peg thereof being square edged at both ends and each of said remaining pegs being bias cut at one end and square edged at the other end such that when said pegs are assembled in a side-by-side relationship, they collectively fit within and form the same shape as said triangular cut-outs, said pegs being successively numbered from 1 to 9, inclusive, with those pegs bearing numbers 1 to 4 being respectively mirror images of those pegs bearing numbers 6 to 9, inclusive; and, means for assigning a numerical value to the pegs in each of said boards, said value being based on multiples of ten, including unity, and the value assigned to successive playing boards being no greater than one multiple of ten.

2. The device of claim 1 wherein each pair of said mirror image pegs numerically total a value of ten.

3. The device of claim 2 wherein said mirror image pegs are geometrically paired in a side-by-side relationship such that the squared edges of said paired pegs are co-extensive.

4. The device of claim 2 wherein said mirror image pegs are geometrically paired by superimposing one of said pegs on the other.

5. The device of claim 1 wherein pegs bearing numbers 1 to 5, inclusive, each have squares formed thereon, said squares being equal to the number borne by said pegs; and, pegs bearing numbers 6 to 9, inclusive, have the same number of squares thereon as their respective mirror image pegs.

* * * * *